United States Patent Office 2,939,891
Patented June 7, 1960

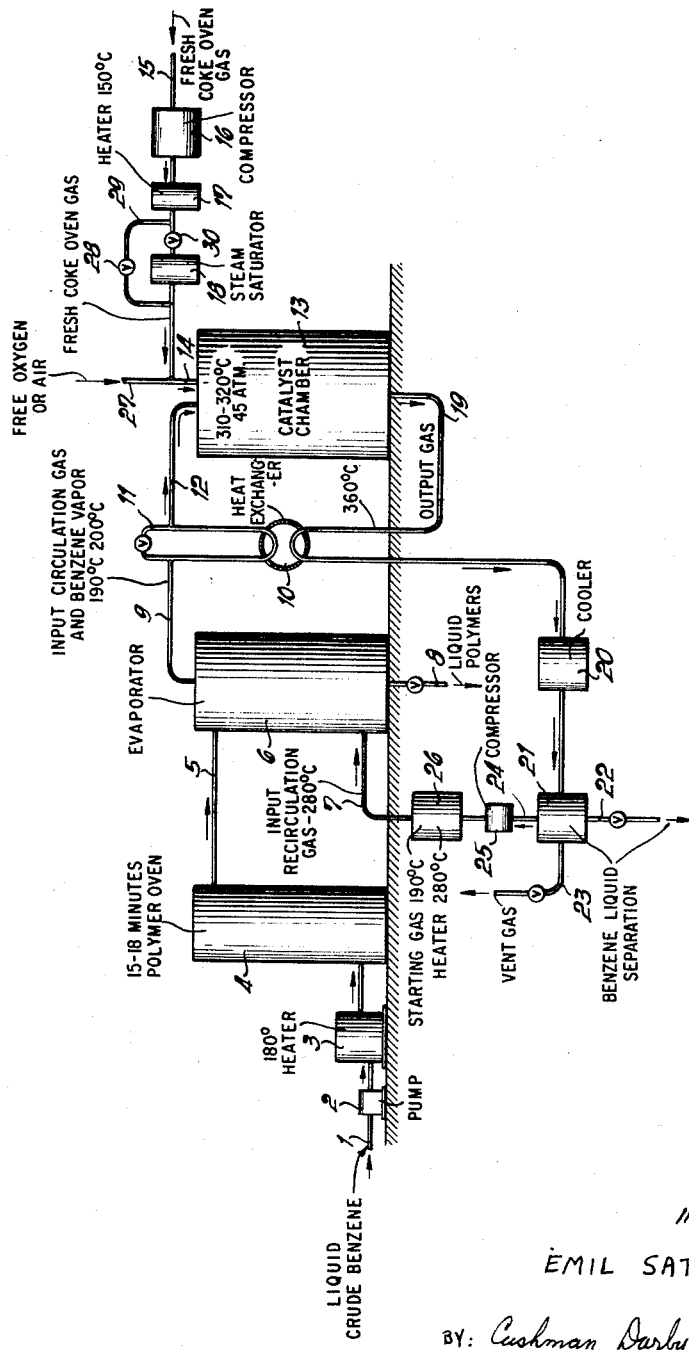

2,939,891

PROCESS FOR THE OPERATION OF AN INSTALLATION FOR THE PRESSURE REFINING OF CRUDE BENZENE

Emil Sattler, Essen, Germany, assignor, by mesne assignments, to Koppers Company, Inc., Pittsburgh, Pa., a corporation of Delaware Filed Dec. 20, 1956, Ser. No. 629,565

4 Claims. (Cl. 260—674)

The present invention relates to a process for the starting of the operation of an installation for the pressure refining of crude benzene. In the general operation of the installation concerned, a hydrogen-containing circulating gas after being charged with crude benzene vapors is passed at elevated temperature, for example 320° C., and under elevated pressure, for example 45 atm., through catalysts, whereby certain unsaturated impurities in the benzene are converted into saturated substances and in addition the compounds containing nitrogen, oxygen and sulphur which are also present in the benzene are reduced to form ammonia, water and hydrogen sulphide respectively.

In such processes, the mixture extracted from the catalyst stage, consisting of vapor of purified benzene and unconsumed hydrogen circulating gas (output mixture), is, owing to the exothermic nature of the refining processes, at a higher temperature than the input mixture fed to the catalyst stage and so this output mixture, is brought into indirect heat exchange with the input mixture, whereby the latter is heated to the peak temperature of about 320° C. Only after this heat exchange is the output mixture subjected to a cooling for the purpose of separating out the purified benzene. The hydrogen-containing input circulating gas which is thus heated is previously charged with crude benzene vapors in an evaporator and leaves this evaporator at a temperature of about 190–200° C., whereafter it is brought into indirect heat exchange with the output reaction mixture leaving the catalyst stage, as already mentioned, so that only the temperature difference between about 200° C. and about 320° C. must be supplied in this heat exchanger. For heating up the circulating gas to a maximum of about 200° C. and for evaporating the crude benzene, an indirect heater operated with hot water or steam is utilized.

In starting such an installation, it is necessary to bring the input circulating gas which is preheated to a maximum temperature of about 200° C. but not yet charged with benzene vapor to the so-called starting temperature of the refining, i.e. to about 320° C., by means of an additional heating arrangement. This additional heating arrangement must remain operative until the temperatures necessary for the catalyst refining have been produced throughout the installation. As soon as these temperatures are reached, the additional heating arrangement is switched off and benzene vapor and fresh hydrogen gas (coke oven gas or town gas) are introduced into the process. The heat yielded in the catalyst refining step is normally sufficient to supply the difference in temperature between a maximum of about 200° C. and 320° C. to which the input circulating gas, leaving the evaporator, must be raised.

In the case of relatively small refining installations having a monthly throughput of up to about 1000 tons, this additional heating arrangement generally has been in the form of an electric induction furnace, but in the case of large installations having a monthly output which is a multiple of this, the use of electrical means for the heating up of the system to the starting temperature is not economically acceptable. The circulating gas leaving the evaporator is in such case then heated up instead by means for indirect gas heating. In both cases, a special arrangement is required for bringing the refining installation, more especially the catalyst stage, to the starting temperature.

It has now been found that exothermic, i.e. heat-yielding, reactions occur between certain constituents of the circulating gas even below the starting temperature for the pressure refining in the catalyst stage, if the circulating gas initially consists of coke oven gas or town gas. These reactions generally take place between the small content of free oxygen in the coke oven gas or town gas as initially introduced and other oxidisable of hydrogenisable constituents of this gas, which reactions commence at a temperature of less than 200° C. under the influence of the catalyst intended for the purpose of the refining. In addition, an oxidation of hydrogen by the free oxygen initially contained in the circulating gas to form water takes place at this temperature.

Thus, if the circulating gas preheated to a temperature of about 190–200° C., but uncharged with benzene, is introduced into the catalyst stage, the temperature of the circulating gas increases owing to the aforesaid exothermic reactions as it passes through the catalyst stage. If this temperature rise in the output gas is utilised in the aforesaid manner for an indirect heating of the input circulating gas before its introduction into the catalyst stage, it would theoretically be possible after a certain time, even without an additional heating arrangement, to reach such a high temperature that the actual pressure refining of the crude benzene can then take place. However, this time would generally be intolerably long, since a part of the heat generated is also lost by radiation, etc. In most cases, the heat generated by the aforesaid exothermic reactions will not even compensate for the losses by radiation.

The invention resides in starting the installation for continuous pressure refining of benzene by temporarily intensifying the exothermic reactions between constituents of the circulating gas which commence below the operating temperature of the catalyst stage for the pressure refining while the gas is still uncharged with crude benzene but is preheated to a temperature not exceeding about 200° C., until the heat quantities developed from these exothermic reactions are sufficient to indirectly heat the circulating gas to be introduced into the catalyst stage, and the catalyst bed and the other parts of the installation from 200° C. to the temperature (about 320° C.) necessary for the pressure refining of the crude benzene.

The steps applied for temporarily intensifying the aforesaid exothermic reactions until the desired refining temperature is automatically set up may be of very different natures. Thus, for example, it is possible to introduce fresh gas and consequently additional free oxygen into the cyclic part of the process at the starting of the installation and thus to replace the oxygen which has been introduced with the circulating gas but has meanwhile been consumed. Normal coke oven gas or town gas contains about 0.5–1% of free oxygen.

In accordance with a further feature of the invention, the quantity of fresh gas supplied for recycling initially, i.e. at the starting of the installation, may be 2–3 times as great as that normally supplied, so that sufficient free oxygen is available during starting to ensure that the exothermic reactions initiated by this free oxygen produce a rapid heating-up both of the catalyst chamber and of the gas mixture flowing therethrough. In addition, the content of free oxygen is increased by additions of pure oxygen or air to the greater volume of recycle gas, as hereinafter described in conjunction with the drawing.

In addition, in accordance with a further proposal of the invention, the quantity of fresh gas supplied at starting may be the same as during normal refining operation, but the content of free oxygen may be increased by introducing oxygen or air into the fresh gas. The introduction of oxygen or air may take place even when no fresh gas is being supplied at starting. In this case, the oxygen or air is directly introduced into the circulating gas.

Finally, the charging of the fresh gas with steam, which is normally required in the refining process for converting the carbon monoxide fraction of the circulating or fresh gas into carbon dioxide and hydrogen, may be reduced to such an extent at the starting of the installation, and the partial steam pressure in the catalyst stage may be so lowered, that conversion of the carbon monoxide into methane preferentially takes place instead of the conversion of the carbon monoxide into carbon dioxide which is required in normal operation. This conversion into methane results from a reaction of the carbon monoxide with the hydrogen present in the circulating gas. Since the conversion into methane is much more exothermic (about 49 Cal. per mol. of carbon monoxide) than the conversion of carbon monoxide with steam (about 9.8 Cal. per mol. of carbon monoxide), so much heat can be very rapidly liberated by suppressing the conversion of carbon monoxide and correspondingly promoting the conversion into methane that self-heating of the installation to the optimum refining temperature takes place in an extremely short time.

The aforesaid steps may also be applied in combination.

An arrangement for carrying out the process according to the invention is illustrated in the drawing. The crude benzene to be purified passes through the duct 1 into the pressure pump 2 and from there into the heater 3, in which it is brought to a temperature of about 180° C. while remaining in the liquid state. The still liquid crude benzene is thereafter introduced into the polymerisation stage 4, in which it remains for some time, i.e. for about 15–80 minutes. During this time, a polymerisation of certain impurities of the benzene takes place, so that these impurities do not enter the vapor phase in the following evaporator. The liquid benzene passes from the polymerisation chamber 4 through the duct 5 into the evaporator 6, into which preheated circulating gas at a temperature of about 280° C. is simultaneously introduced through the duct 7. In the evaporator, by far the greater part of the crude benzene is evaporated with a supply of additional heat with exception of a liquid residue, which contains the aforesaid polymerisation products in addition to a certain quantity of benzene. This residue is extracted through the duct 8. The input circulating gas from line 7 becomes charged with benzene vapor in separator 6 flows through the duct 9 at a temperature of about 190° C. into the indirect heat exchanger 10, in which the input gas is brought into indirect heat exchange with the output gas-vapor mixture leaving the catalyst stage. When the installation is in full operation, the temperature of the output gas-vapor mixture (about 360° C.) leaving the catalyst stage is sufficient to heat the benzene charged input circulating gas flowing from the duct 9 through the heat exchanger 10 to a temperature of about 310–320° C., which is required for the catalyst refining reaction. In some cases, the evolution of heat in the catalyst stage is even so great that the charged input circulating gas would reach an excessive temperature in the indirect heat exchanger 10. In this case, it is necessary to feed part of the circulating gas past the heat exchanger 10 through the by-pass duct 11. The input circulating gas charged with crude benzene then enters the catalyst stage 13 through the duct 12. At the same time, fresh gas is introduced into the catalyst stage through the duct 14. This fresh gas, for example coke oven gas or town gas, passes through the duct 15, first into the compressor 16 and then into a heater 17, in which it is brought to a temperature of about 150° C., and thereafter into a steam saturator 18 in which the fresh gas is charged with steam to saturation point.

The output reaction mixture leaves the catalyst stage 13 by way of the duct 19 and then passes into the heat exchanger 10 and from there into the cooler 20, in which the mixture is cooled until the benzene is liquefied, the pressure being maintained. In the following separator 21, the liquid benzene is separated from the uncondensed fractions. The liquid benzene can be withdrawn through the duct 22. In addition, such a proportion of the circulating gas can be removed from the separator 21 through the duct 23 that the quantity of carbon dioxide and methane, formed in the circulating gas in the catalyst stage in known manner, is always maintained at the same value. The remaining output circulating gas first passes through the pipe 24 into an intermediate compressor 25 and then into an indirect heater 26, in which it is heated to a temperature of 280° C., whereafter it passes through the duct 7 into the evaporator 6.

When the installation is started, no crude benzene is at first supplied. The input circulating gas flows into the catalyst stage 13 at a temperature of about 190° C., which is imparted thereto in the heater 26 by means of indirect heating with steam in the coils of a steam pipe, in which catalyst stage no refining reactions supplying sufficient heat for the heating up of the circulating gas take place, owing to absence of crude benzene. In order rapidly to produce a starting temperature for the pressure refining, the following steps may be carried out singly or in combination. For example, fresh coke oven gas or town gas may be introduced into the process through the compressor 16 at the commencement, if desired in a greater quantity as aforesaid than is required in the normal catalyst pressure refining operation, whereby more free oxygen is introduced into the catalyst stage. In addition, free oxygen or air may be introduced into the duct 14 through the duct 27, so that the fresh oxygen content of the gas mixture in the catalyst stage is increased. Finally, the valve 28 in the by-pass pipe 29 of the steam saturator 18 may be opened and the valve 30 may be simultaneously closed, so that the fresh coke oven gas enters the catalyst stage 13 at elevated temperature, but without any appreciable steam charging. Owing to the fact that the partial steam pressure in the catalyst stage 13 is greatly reduced as compared with that obtaining during normal operation, the conversion into methane of the carbon monoxide carried along with the fresh gas is preferentially effected with hydrogen, which reaction supplies so much heat that the catalyst stage assumes after a relatively short time a temperature at which the actual refining reactions commence. As soon as this has happened, the additional supply of oxygen through the duct 27 can be stopped, or the valve 28 may be closed again and the valve 30 opened, and finally the delivery of the compressor 16 may be reduced to the normal value.

I claim:
1. A procedure for starting the operation of a process for the catalytic pressure refining of crude benzene, which process comprises passing the input portion of hydrogen-containing cyclically circulating constant volume of coke oven gas, charged with crude benzene vapors at an elevated temperature between 310° and 320° C. and under elevated pressure of the order of 45 atm., through a catalyst zone and passing the output gas vapor mixture after leaving the catalyst zone into indirect heat exchange with the input portion of the circulating gas while charged with crude benzene vapors in advance of entry into the catalyst zone to heat the input portion from 200° C. to 310–320° C., thereafter cooling the output portion after said indirect heat exchange to condense the purified benzene vapors to liquid state, removing the latter and a portion of the gas from the cyclic flow system, recompressing and reheating the residual output portion of the gas to below 200° C. before recharging it with crude benzene vapors to be purified, recharging the so heated output portion with a flow of fresh quantities of crude benzene vapors to be purified to constitute the input portion of the cyclically circulating hydrogen-containing coke oven gas, flowing the so constituted input portion into indirect heat exchange with the output portion as aforesaid and thence at the elevated temperature and pressure aforesaid into said catalyst zone, and flowing fresh makeup hydrogen containing coke oven with the initially contained small content of 0.5–1% of free oxygen and other oxidizable and hydrogenizable constituents of this gas into the input gas passing into the catalyst zone along with steam to convert carbon monoxide in said gas into carbon dioxide and hydrogen in the catalyst stage, said starting procedure comprising: cyclically flowing fresh coke oven gas aforesaid preheated to a temperature of about 190° C. in a volume at least twice as great as the constant volume normally cycled during the aforesaid pressure refining through the cyclic system as aforesaid, while holding the fresh crude benzene to be purified idle to flow into said gas, until the heat developed in the catalyst zone, as a result of exothermic reactions whcih commence below the catalyst operating temperature necessary for refining of the benzene vapors, is sufficient to heat the cyclically circulating gas, the catalyst, and the other parts of the cyclic system to the temperature between 310° and 320° C. necessary for starting the catalytic pressure refining of crude benzene, and thereafter recharging the normal input portion of the catalytically circulating coke oven gas with fresh quantities of crude benzene vapors as aforesaid for its catalytic pressure refining.

2. A method as claimed in claim 1, and in which a gas comprising free oxygen is introduced to the starting coke oven gas to increase the fresh oxygen content of the coke oven gas for exothermic reaction with constituents of the starting gas, while the starting coke oven gas is circulating with the benzene vapors held idle to flow into the starting coke oven gas, and in which the starting coke oven gas is kept low in steam to an extent such that the partial steam pressure in the catalyst stage is held at a level favoring the exothermic conversion of the carbon monoxide of the starting coke oven gas into methane.

3. A method as claimed in claim 1, and in which a gas comprising free oxygen is introduced to the starting coke oven gas to increase the fresh oxygen content of the coke oven gas for exothermic reaction with constituents of the starting gas while it is circulating with the benzene vapors held idle to flow into the starting coke oven gas.

4. A method as claimed in claim 1, and in which the starting coke oven gas is kept low in steam to an extent such that the partial steam pressure in the catalyst stage is held at a level favoring the exothermic conversion of the carbon monoxide of the starting coke oven gas into methane.

References Cited in the file of this patent

UNITED STATES PATENTS

| | | |
|---|---|---|
| 2,167,471 | Auerbach | July 25, 1939 |
| 2,266,095 | Thayer | Dec. 16, 1941 |
| 2,701,267 | Urban et al. | Feb. 1, 1955 |
| 2,773,014 | Snuggs et al. | Dec. 4, 1956 |

FOREIGN PATENTS

| | | |
|---|---|---|
| 454,368 | Great Britain | Sept. 21, 1936 |